United States Patent
Wang et al.

(10) Patent No.: US 10,425,656 B2
(45) Date of Patent: Sep. 24, 2019

(54) METHOD OF INTER-FRAME PREDICTION FOR VIDEO ENCODING AND DECODING

(71) Applicant: Peking University Shenzhen Graduate School, Shenzhen (CN)

(72) Inventors: Zhenyu Wang, Shenzhen (CN); Ronggang Wang, Shenzhen (CN); Xiubao Jiang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 0 days.

(21) Appl. No.: 15/746,932

(22) PCT Filed: Jan. 19, 2016

(86) PCT No.: PCT/CN2016/071341
§ 371 (c)(1),
(2) Date: Jan. 23, 2018

(87) PCT Pub. No.: WO2017/124298
PCT Pub. Date: Jul. 27, 2017

(65) Prior Publication Data
US 2019/0110060 A1    Apr. 11, 2019

(51) Int. Cl.
*H04N 11/02*  (2006.01)
*H04N 19/513* (2014.01)
*H04N 19/176* (2014.01)
*H04N 19/59*  (2014.01)
*H04N 19/597* (2014.01)
*H04N 19/523* (2014.01)

(52) U.S. Cl.
CPC .......... *H04N 19/513* (2014.11); *H04N 19/176* (2014.11); *H04N 19/523* (2014.11); *H04N 19/59* (2014.11); *H04N 19/597* (2014.11)

(58) Field of Classification Search
CPC ..................................................... H04N 19/513
USPC ....................................... 375/240.01–240.29
See application file for complete search history.

(56) References Cited

U.S. PATENT DOCUMENTS 8,446,957 B2 * 5/2013 Kurata ................. H04N 19/176
                                                       375/240.16
8,699,562 B2 * 4/2014 Park ..................... H04N 19/176
                                                       375/240
(Continued)

*Primary Examiner* — Leron Beck
(74) *Attorney, Agent, or Firm* — SV Patent Service

(57) ABSTRACT

A video encoding and decoding method, and its inter-frame prediction method, device and system thereof are disclosed. The inter-frame prediction method includes obtaining a motion vector of the current image block and related spatial position of a current pixel, obtaining a motion vector of the current pixel according to the motion vector of the current image block and the related spatial position of the current pixel; and obtaining a predicted value of the current pixel according to the motion vector of the current pixel. The method considers both the motion vector of the current image block and the related spatial position information of the current pixel during inter-frame prediction. The method can accommodate lens distortion characteristics of different images and zoom-in/zoom-out produced when the object moves in pictures, thereby improving the calculation accuracy of pixels' motion vectors, and improving inter-frame prediction performance and compression efficiency in video encoding and decoding.

6 Claims, 4 Drawing Sheets

(56) References Cited

U.S. PATENT DOCUMENTS

| | | | |
|---|---|---|---|
| 9,313,493 B1* | 4/2016 | Maaninen | H04N 19/176 |
| 9,473,752 B2* | 10/2016 | Chen | H04N 19/597 |
| 2003/0067988 A1* | 4/2003 | Kim | H04N 5/145 |
| | | | 375/240.17 |
| 2003/0202596 A1* | 10/2003 | Lainema | H04N 19/56 |
| | | | 375/240.16 |
| 2008/0159390 A1* | 7/2008 | Lu | H04N 19/105 |
| | | | 375/240.16 |
| 2010/0239015 A1* | 9/2010 | Wang | H04N 19/197 |
| | | | 375/240.16 |

* cited by examiner

METHOD OF INTER-FRAME PREDICTION FOR VIDEO ENCODING AND DECODING

TECHNICAL FIELD

The present invention relates to the field of digital video encoding and decoding technology, and specifically, to a video encoding and decoding method, and its inter-frame prediction method, device and system thereof.

BACKGROUND OF THE INVENTION

At present, the virtual reality technology and related applications are developing rapidly. In the virtual reality technology, panoramic images and panoramic videos are an important part. Panoramic video records all surrounding view pictures with a large data amount, so the panoramic video compression is a key technology in virtual reality application. As a new emerging media, compared with the traditional video, panoramic video has the characteristics of wide field of view, high resolution and a large data amount. Using panoramic videos, the observer's view does not change. Change the observation direction to observe all the surrounding scenes. Ordinary two-dimensional video reflects only a part of the panoramic video.

Cylindrical panoramic video is a common panoramic video, equivalent to a virtual camera. The three-dimensional space object is projected onto the cylinder. Cylindrical panoramic videos can be generated by using multi-camera or single-camera acquisition systems.

As the field of view of panoramic video is 5-6 times of that of the normal video. To provide users with the same visual quality, the data volume of panoramic video is 5-6 times of that of the normal video. According to the traditional video transmission scheme, the use of panoramic video in the network environment becomes more and more difficult. Block encoding and transmission have become a common solution for the transmission of panoramic video for users who need to see only part of the panoramic video at the same moment.

Referring to FIG. 1, a transmission method of the cylindrical panoramic video mainly includes the following steps:

A panoramic image is segmented and each image block sequence is encoded independently.

Then the encoded data to be used are selected for transmission. Here one can select the data based on the user's current perspective. The transmission media may be the Internet, wireless networks, local area networks, optical networks, other suitable transmission media, or suitable combinations of these transmission media.

Finally, after the decoder receives the data, these block sequences are independently decoded and transformed to get the desired image.

In the block encoding of panoramic video, the size of the block has important impact on the encoding efficiency of panoramic video and the transmission area. These two factors directly determine the data amount to be transmitted. If the encoding block is small, the transmission area is small, but the encoding efficiency is low. If the encoding block is large, the encoding efficiency is high, but the transmission area is also large. Therefore, for the same visual quality, the data amount to be transmitted for different encoding block sizes is not the same.

In addition, for special characteristics of panoramic videos compared with normal videos, such as circular panoramic videos and high distortion of pictures, a special encoding technology is needed to improve the compression efficiency of the panoramic video.

In the traditional video encoding and decoding standard, an inter-frame prediction method is adopted. The inter-frame prediction method takes an image block as a unit, and selects a block of the same size on the reference image as a prediction block of the current image block. In panoramic video, there is a big distortion in the picture. When the object moves in pictures, zoom-in/zoom-out is produced along with the movement, thus affecting the predictive performance of encoding and the compression efficiency.

SUMMARY OF THE INVENTION

The present invention provides a video encoding and decoding method, and its inter-frame prediction method, device and system thereof, to improve inter-frame prediction performance and compression efficiency in the video encoding and decoding process with partial lens distortions.

According to an aspect of the present invention, the present invention provides an inter-frame prediction method for video encoding and decoding, including the steps of:

obtaining a motion vector of the current image block and the related spatial position information of the current pixel;

obtaining a motion vector of the current pixel according to the motion vector of the current image block and the related spatial position information of the current pixel; and obtaining a predicted value of the current pixel according to the motion vector of the current pixel.

According to a further aspect of the present invention, the invention further provides an inter-frame prediction device for video encoding and decoding, comprising:

an information acquisition module configured to obtain a motion vector of a current image block and related spatial position information of a current pixel;

a calculation module configured to obtain a motion vector of the current pixel according to the motion vector of the current image block and the related spatial position information of the current pixel; and a prediction module configured to obtain a predicted value of the current pixel according to the obtained motion vector of the current pixel.

According to a third aspect of the present invention, the invention further provides a method for video encoding, including the steps of:

dividing a current image into a plurality of image blocks;

obtaining a predicted image block of the current image block by using the above inter-frame prediction method;

subtracting the current image block from the predicted image block to obtain a residual block; and transforming, quantizing, and entropy encoding the residual block to obtain an encoded stream.

According to a fourth aspect of the present invention, the invention further provides a method for video decoding, including the steps of:

entropy decoding, inverse quantizing and inverse transforming an encoded stream to obtain a reconstructed residual block;

obtaining a predicted image block of the current image block by using the above inter-frame prediction method; and adding the predicted image block to the reconstructed residual block to obtain a reconstructed image block.

According to a fifth aspect of the present invention, the invention further provides a system for video encoding and decoding, comprising:

an image block dividing device configured to divide a current image into a plurality of image blocks;

an inter-frame prediction device configured to obtain a prediction image block of the current image block;

a residual calculating device configured to subtract the current image block from the predicted image block to obtain a residual block; and a stream generating device configured to transform, quantizing, and entropy encode the residual block to obtain an encoded stream.

According to a sixth aspect of the present invention, the invention further provides a system for video encoding and decoding, comprising:

a residual block reconstruction device configured to entropy decode, inverse quantize and inverse transform an encoded stream to obtain a reconstructed residual block;

an inter-frame prediction device configured to obtain a prediction image block of the current image block; and an image block reconstruction device configured to adding the predicted image block to the reconstructed residual block to obtain a reconstructed image block.

In a video encoding and decoding method, and an inter-frame prediction method, device and system thereof provided in the present invention, during inter-frame prediction, by considering both the motion vector of the current image block and the related spatial position information of the current pixel, the method can accommodate lens distortions characteristics of different images and zoom-in/zoom-out produced when the object moves in pictures, thereby improving the calculation accuracy of motion vectors of pixels, and improving inter-frame prediction performance and compression efficiency in the video encoding and decoding process.

DETAILED DESCRIPTION OF THE INVENTION

First of all, it should be noted that, the video encoding and decoding method, and its inter-frame prediction method, device and system thereof provided in the present invention may be applied to a panoramic video encoding and decoding, and may also be applied to a semi-panorama or other sequence of encoding and decoding with large lens distortions. For convenient description of the present invention, the present invention will only be described by using a panoramic video encoding and decoding as an example.

The inventive idea of the present invention is that for a typical panoramic video encoding, a panoramic view is obtained by the cylindrical mapping, so that the pictures at the top and the bottom of the panoramic image are stretched laterally. As the object moves from the center of the image to the top or bottom, the width of the object in the image increases; otherwise, the width of the object in the image decreases. Meanwhile, the magnitude of stretching or shrinking is related to the longitudinal coordinate and longitudinal motion vector of the object in the image, so the motion vector of each pixel in the image block can be more accurately calculated from these data (related spatial position information), and inter-frame prediction performance and compression efficiency in the panoramic video encoding and decoding process are improved.

The present invention will become apparent from the following detailed description of embodiments and from the accompanying drawings.

Embodiment 1

Figure 1:
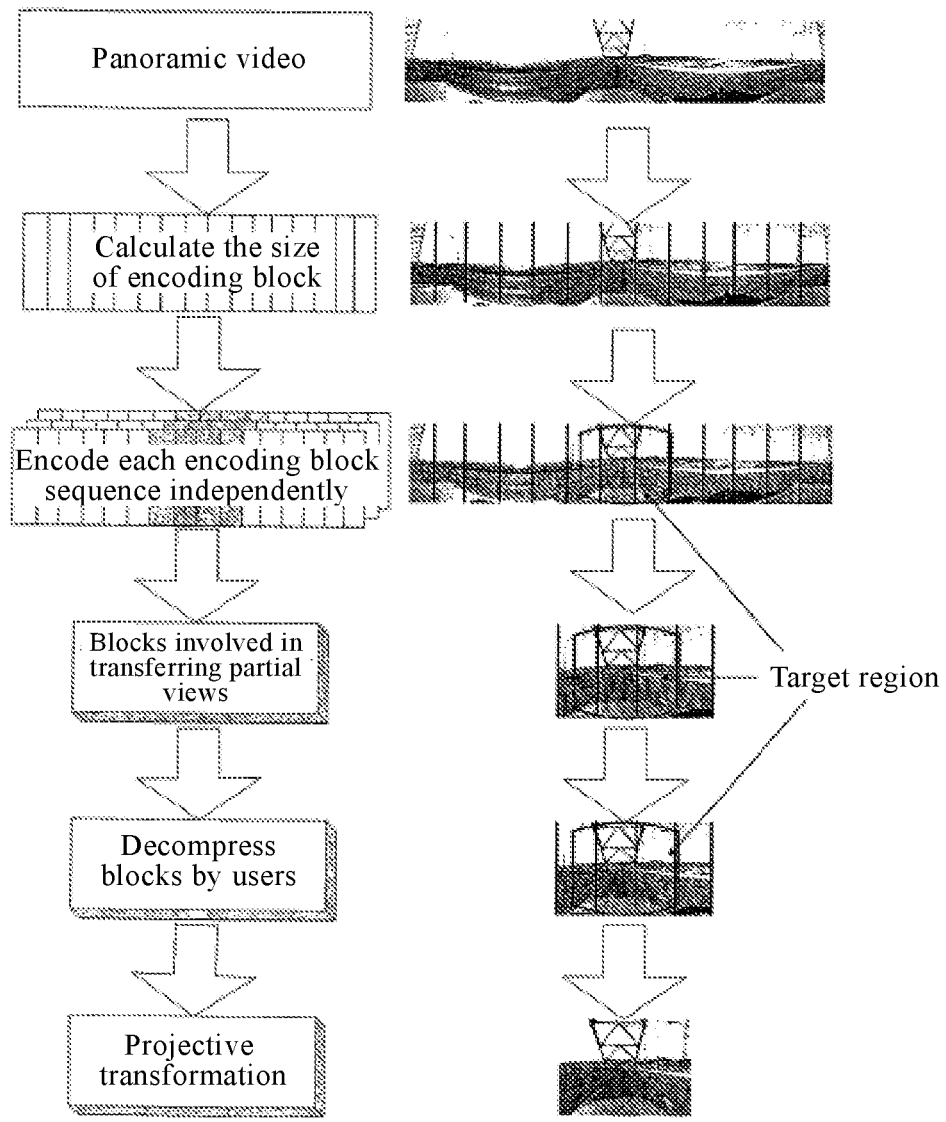
FIG. 1 is a schematic illustration of a transmission method for cylindrical panoramic video.
Figure 2:
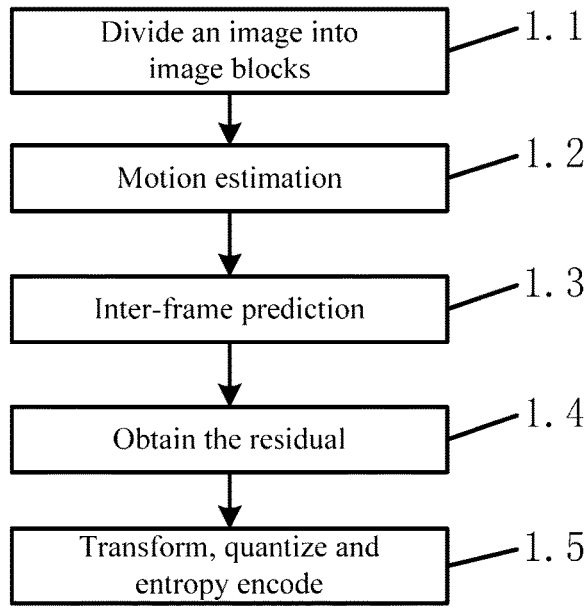
FIG. 2 is a flowchart of a panoramic video encoding method according to an embodiment in the present invention.

Referring to FIG. 2, this embodiment provides a panoramic video encoding method, comprising the steps of:

Step 1.1: dividing a current image into a plurality of image blocks. Specifically, the size of the segmented image blocks can be selected according to the actual needs.

Step 1.2: obtaining a motion vector of a current image block through motion estimation $(MV_x, MV_y)$.

Specifically, the motion estimation adopts any feasible method in the prior art.

Step 1.3: obtaining predicted image block by inter-frame prediction.

Figure 3:
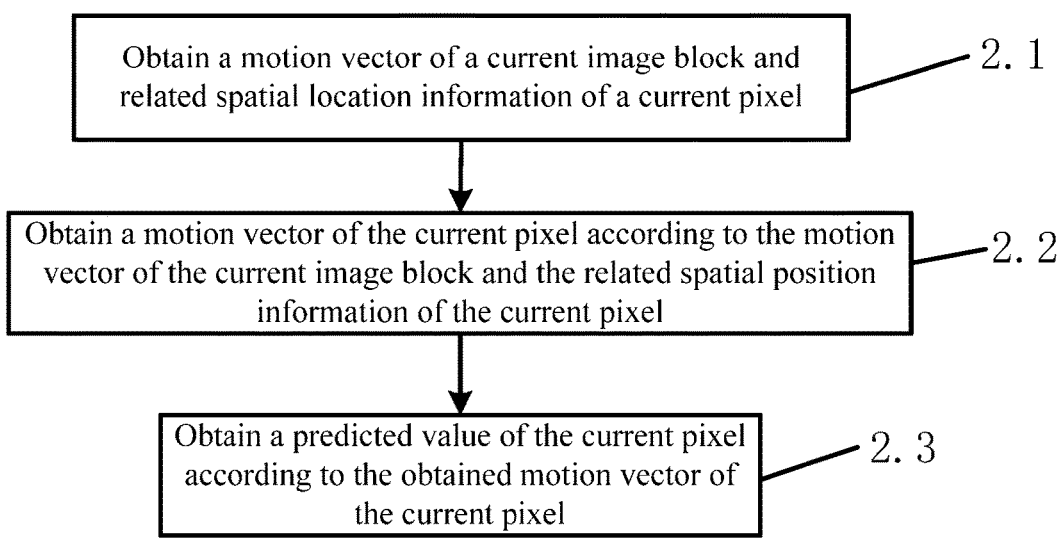
FIG. 3 is a flowchart of inter-frame prediction in a panoramic video encoding and decoding process according to an embodiment in the present invention.

Referring to FIG. 3, according to the present embodiment, the inter-frame prediction method comprises the steps of:

Step 2.1: obtaining a motion vector of the current image block and the related spatial position information of a current pixel.

Step 2.2: obtaining a motion vector of the current pixel according to the motion vector of the current image block and the related spatial position information of the current pixel.

According to the embodiment, the related spatial position information of the current pixel comprises the size of the current image, the coordinates of the current image block in the current image, the size of the current image block, and the coordinates of the current pixel in the current image block.

Figure 4:
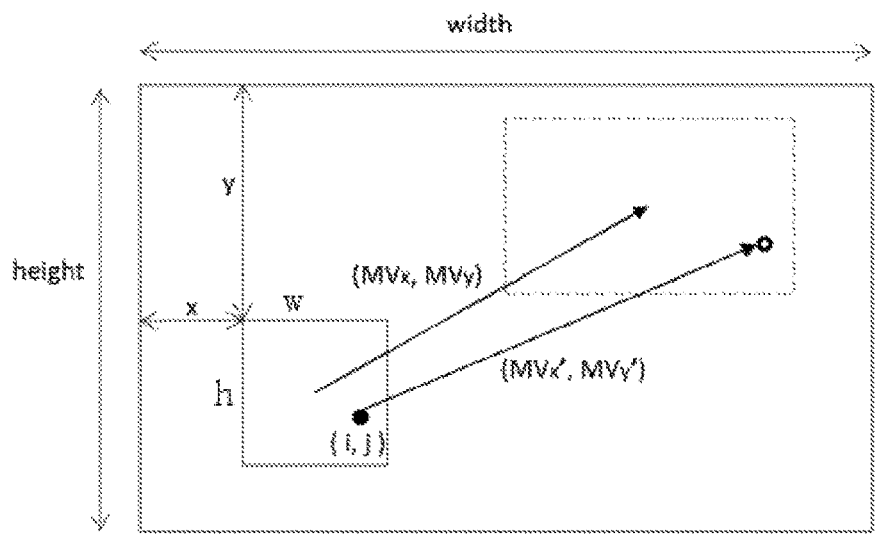
FIG. 4 is a schematic illustration of inter-frame prediction according to an embodiment in the present invention.

Specifically, referring to FIG. 4, a schematic view of an inter-frame prediction method according to the embodiment is shown.

The width of the current image is width, and the height of the image is height. The motion vector of the current image block is defined as the motion vector of the pixel point in the center of the image block, which is denoted as $(MV_x, MV_y)$. Certainly, in other embodiments, the motion vector of the current image block may also adopt other defined expressions. In addition, the current image block has a width of w and a height of h. The coordinates of the current image block in the current image are defined as the coordinates (x, y) of the pixels in the upper left corner of the current image block in the current image. In this coordinate system, the upper left corner of the current image can be taken as the origin, and the down direction and the right direction are taken as the positive direction for the vertical coordinate and the horizontal coordinate, respectively. The coordinate system used by the coordinate (i, j) in the current image block may be a coordinate system with the pixel at the upper left corner of the current image block as the origin, and the down direction and the right direction as the positive direction for the vertical coordinate and the horizontal coordinate, respectively.

In other embodiments, the related spatial position information of the current pixel may select other available information according to the actual needs. In this embodiment, only the above information is taken as an example to describe the present invention. It should be understood that the present invention precisely considers the related spatial position information of the current pixel, thus overcoming the related problems caused by lens distortion characteristics of panorama images and zoom-in/zoom-out produced when the object moves in pictures, thereby improving the calculation accuracy of motion vectors of pixels, and improving inter-frame prediction performance and compression efficiency in the panoramic video encoding and decoding process.

Therefore, according to the embodiment, obtain the motion vector of the current pixel through the following functional relationship in Step 2.2:

$$(MV'_x, MV'_y) = f(x, y, w, h, i, j, MV_x, MV_y, \text{width}, \text{height})$$

where f is a preset function, (x,y) is the coordinate of the pixel at the upper left corner of the current image block in the current image, (i,j) is the coordinate of the current pixel in the current image block, w and h are the width and the height of the current image block respectively, width and height are the width and the height of the current image respectively, and $(MV_x, MV_y)$ is the motion vector of the current image block.

Specifically, $MV'_x$, $MV'_y$ can be obtained by the following formula respectively:

$$MV'_x = MV_x + \alpha \times \left(1 - \frac{w}{2}\right), \ MV'_y = MV_y$$

where $\alpha$ is the horizontal scaling factor, which can be approximated by the following formula:

$$\alpha = \frac{\text{height}}{\text{height} - \pi \times MV_y \times \tan\left(\frac{\pi}{2} - \frac{y}{\text{height}} \times \pi\right)}.$$

Step 2.3: obtaining a predicted value of the current pixel according to the obtained motion vector of the current pixel, and obtaining a prediction image block of the current image block.

According to the embodiment, preferably, when the obtained reference sample location pointed by the motion vector of the current pixel is not an integer pixel location, a sample value of a reference sample location is calculated by using an interpolation method, and the sample value is taken as a prediction value of the current pixel; when the obtained reference sample location pointed by the motion vector of the current pixel is an integer pixel location, the pixel value of the integer pixel location is taken as the sample value of the reference sample location, and the sample value is taken as a prediction value of the current pixel.

Specifically, the interpolation method in the embodiment is an adaptive interpolation method. The adaptive interpolation uses different interpolation filters. The selection of interpolation filters is determined by the reference sample coordinates (horizontal coordinate and vertical coordinate).

The interpolation filter selection method comprises, but not limited to, the following way: Assuming that the coordinate of the reference sample location is (refX, refY), when the refY is less than height/2, the 4-tap filter is used for horizontal interpolation and the 8-tap filter is used for longitudinal interpolation; otherwise, the 8-tap filter is used for horizontal interpolation and the 4-tap filter is used for longitudinal interpolation. ¼ pixel accuracy is adopted for interpolation. For the 8-tap filter, the filter corresponding to the ¼ pixel position is {-1, 4, -10, 57, 19, -7, 3, -1}, the filter corresponding to the 2/4 pixel position is {-1, 4, -11, 40, 40, -11, 4, -1}, and the filter corresponding to the ¾ pixel position is {-1, 3, -7, 19, 57, -10, 4, -1}. For the 4-tap filter, the filter corresponding to the ¼ pixel position is {2, -9, 57, 17, -4, 1}, the filter corresponding to the 2/4 pixel position is {2, -9, 39, 39, -9, 2}, and the filter corresponding to the ¾ pixel position is {1, -4, 17, 57, -9, 2}.

As a part of the panoramic image is obtained through the fisheye camera, when the normal panorama image is obtained through cylindrical mapping, the longitudinal resolution of the upper part of the picture is high and the horizontal resolution is low. On the contrary, the longitudinal resolution of the lower part of the picture is low, and the horizontal resolution is high. In case of cylinder mapping, the part with low resolution is obtained by interpolation. This part of the picture is relatively smooth in the horizontal (or longitudinal) direction, so not many taps are required for interpolation. The amount of computation is reduced compared with the traditional interpolation method using the same filters. Therefore, in this embodiment, the interpolation filter is selected as described above. Certainly, in other embodiments, the interpolation filter can be designed freely according to the actual needs.

Step 1.4: subtracting the pixel in the same location of the predicted image block from each pixel of the current image block to obtain the residual block.

Step 1.5: transforming and quantizing the residual block to obtain a quantized block; and finally, writing each coefficient of the quantized block and the motion vector of the current image block into the encoded stream by entropy encoding.

Embodiment 2

Figure 5:
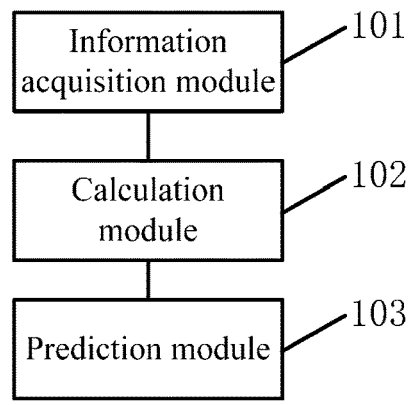
FIG. 5 is a block diagram of an inter-frame prediction device for the panoramic video encoding and decoding according to an embodiment in the present invention.

Referring to FIG. 5, based on the method for inter-frame prediction for the panoramic video encoding and decoding according to Embodiment 1, an inter-frame prediction device for the panoramic video encoding and decoding is further provided in the embodiment, comprising of an information acquisition module 101, a calculation module 102, and a prediction module 103.

The information acquisition module 101 is configured to obtain a motion vector of the current image block and the related spatial position information of the current pixel.

The calculation module 102 is configured to obtain a motion vector of the current pixel according to the motion vector of the current image block and the related spatial position information of the current pixel.

According to the embodiment, the related spatial position information of the current pixel comprises the size of the current image, the coordinates of the current image block in the current image, the size of the current image block, and the coordinates of the current pixel in the current image block.

Specifically, referring to FIG. 4, a schematic view of an inter-frame prediction device according to the embodiment is shown;

The width of the current image is width, and the height of the image is height. The motion vector of the current image block is defined as the motion vector of the pixel point in the center of the image block, which is denoted as $(MV_x, MV_y)$. Certainly, in other embodiments, the motion vector of the current image block may also adopt other defined expressions. In addition, the current image block has a width of w and a height of h. The coordinates of the current image block in the current image are defined as the coordinates (x, y) of the pixels in the upper left corner of the current image block in the current image. In this coordinate system, the upper left corner of the current image can be taken as the origin, and the down direction and the right direction are taken as the positive direction for the vertical coordinate and the horizontal coordinate, respectively. The coordinate system used by the coordinate (i, j) in the current image block may be a coordinate system with the pixel at the upper left corner of the current image block as the origin, and the down direction and the right direction as the positive direction for the vertical coordinate and the horizontal coordinate, respectively.

In other embodiments, the related spatial position information of the current pixel may select other available information according to the actual needs. In this embodiment, only the above information is taken as an example to describe the present invention. It should be understood that the present invention precisely considers the related spatial position information of the current pixel, thus overcoming the related problems caused by lens distortions characteristics of panorama images and zoom-in/zoom-out produced when the object moves in pictures, thereby improving the calculation accuracy of motion vectors of pixels, and improving inter-frame prediction performance and compression efficiency in the panoramic video encoding and decoding process.

Therefore, according to the embodiment, the motion vector of the current pixel through the following functional relationship is obtained by using the calculation module 102:

$$(MV'_x, MV'_y) = f(x, y, w, h, i, j, MV_x, MV_y, width, height)$$

where f is a preset function, (x,y) is the coordinate of the pixel at the upper left corner of the current image block in the current image, (i,j) is the coordinate of the current pixel in the current image block, w and h are the width and the height of the current image block respectively, width and height are the width and the height of the current image respectively, and $(MV_x, MV_y)$ is the motion vector of the current image block.

Specifically, $MV'_x$, $MV'_y$ can be obtained by the following formula respectively:

$$MV'_x = MV_x + \alpha \times \left(1 - \frac{w}{2}\right), \quad MV'_y = MV_y$$

where $\alpha$ is the horizontal scaling factor, which can be approximated by the following formula:

$$\alpha = \frac{height}{height - \pi \times MV_y \times \tan\left(\frac{\pi}{2} - \frac{y}{height} \times \pi\right)}.$$

The prediction module 103 is configured to obtain a predicted value of the current pixel according to the obtained motion vector of the current pixel, and obtaining a prediction image block of the current image block.

According to the embodiment, preferably, when an obtained reference sample location pointed by the motion vector of the current pixel is not an integer pixel location, the prediction module 103 is configured to calculating a sample value of a reference sample location by using an interpolation method, and the sample value is taken as a prediction value of the current pixel; when the obtained reference sample location pointed by the motion vector of the current pixel is an integer pixel location, the prediction module 103 is configured to take the pixel value of the integer pixel location as the sample value of the reference sample location, and the sample value is taken as a prediction value of the current pixel.

Specifically, the interpolation method in the embodiment is an adaptive interpolation method. The adaptive interpolation uses different interpolation filters. The selection of interpolation filters is determined by the reference sample coordinates (horizontal coordinate and vertical coordinate). The interpolation filter selection method comprises, but not limited to, the following way: Assuming that the coordinate of the reference sample location is (refX, refY), when the refY is less than height/2, the 4-tap filter is used for horizontal interpolation and the 8-tap filter is used for longitudinal interpolation; otherwise, the 8-tap filter is used for horizontal interpolation and the 4-tap filter is used for longitudinal interpolation. ¼ pixel accuracy is adopted for interpolation. For the 8-tap filter, the filter corresponding to the ¼ pixel position is {-1, 4, -10, 57, 19, -7, 3, -1}, the filter corresponding to the 2/4 pixel position is {-1, 4, -11, 40, 40, -11, 4, -1}, the filter corresponding to the ¾ pixel position is {-1, 3, -7, 19, 57, -10, 4, -1}. For the 4-tap filter, the filter corresponding to the ¼ pixel position is {2, -9, 57, 17, -4, 1}, the filter corresponding to the 2/4 pixel position is {2, -9, 39, 39, -9, 2}, the filter corresponding to the ¾ pixel position is {1, -4, 17, 57, -9, 2}.

As a part of the panoramic image is obtained through the fisheye camera, when the normal panorama image is obtained through cylindrical mapping, the longitudinal resolution of the upper part of the picture is high and the horizontal resolution is low. On the contrary, the longitudinal resolution of the lower part of the picture is low, and the horizontal resolution is high. In case of cylinder mapping, the part with low resolution is obtained by interpolation. This part of the picture is relatively smooth in the horizontal (or longitudinal) direction, so not many taps are required for interpolation. The amount of computation is reduced compared with the traditional interpolation method using the same filters. Therefore, in this embodiment, the interpolation filter is selected as described above. Certainly, in other embodiments, the interpolation filter can be designed freely according to the actual needs.

Embodiment 3

Figure 6:
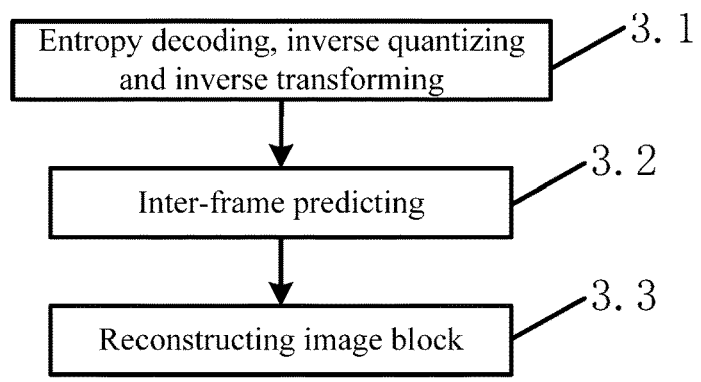
FIG. 6 is a flowchart of a panoramic video decoding method according to an embodiment in the present invention

Referring to FIG. 6, the embodiment provides a panoramic video decoding method, comprises the steps of:

Step 3.1: entropy decoding, inverse quantizing and inverse transforming the encoded stream to obtain a reconstructed residual block.

Step 3.2: obtaining predicted image block by inter-frame prediction.

Referring to FIG. 3, according to the embodiment, the inter-frame prediction method comprises the steps of:

Step 2.1: obtaining a motion vector of the current image block and the related spatial position information of the current pixel.

Step 2.2: obtaining a motion vector of the current pixel according to the motion vector of the current image block and the related spatial position information of the current pixel. Specifically, the motion vector of the current image block may be obtained through motion estimation.

According to the embodiment, the related spatial position information of the current pixel comprises the size of the current image, the coordinates of the current image block in the current image, the size of the current image block, and the coordinates of the current pixel in the current image block.

Specifically, referring to FIG. 4, a schematic view of an inter-frame prediction method according to the embodiment is shown.

The width of the current image is width, and the height of the image is height. The motion vector of the current image block is defined as the motion vector of the pixel point in the center of the image block, which is denoted as ($MV_x$, $MV_y$). Certainly, in other embodiments, the motion vector of the current image block may also adopt other defined expressions. In addition, the current image block has a width of w and a height of h. The coordinates of the current image block in the current image are defined as the coordinates (x, y) of the pixels in the upper left corner of the current image block in the current image. In this coordinate system, the upper left corner of the current image can be taken as the origin, and the down direction and the right direction are taken as the positive direction for the vertical coordinate and the horizontal coordinate, respectively. The coordinate system used by the coordinate (i, j) in the current image block may be a coordinate system with the pixel at the upper left corner of the current image block as the origin, and the down direction and the right direction as the positive direction for the vertical coordinate and the horizontal coordinate, respectively.

In other embodiments, the related spatial position information of the current pixel may select other available information according to the actual needs. In this embodiment, only the above information is taken as an example to describe the present invention. It should be understood that the present invention precisely considers the related spatial position information of the current pixel, thus overcoming the related problems caused by lens distortion characteristics of panorama images and zoom-in/zoom-out produced when the object moves in pictures, thereby improving the calculation accuracy of motion vectors of pixels, and improving inter-frame prediction performance and compression efficiency in the panoramic video encoding and decoding process.

Therefore, according to the embodiment, the motion vector of the current pixel is obtained through the following functional relationship in Step 3.2:

$(MV'_x, MV'_y) = f(x, y, w, h, i, j, MV_x, MV_y, \text{width}, \text{height})$ where f is a preset function, (x,y) is the coordinate of the pixel at the upper left corner of the current image block in the current image, (i,j) is the coordinate of the current pixel in the current image block, w and h are the width and the height of the current image block respectively, width and height are the width and the height of the current image respectively, and ($MV_x$, $MV_y$) is the motion vector of the current image block.

Specifically, $MV'_x$, $MV'_y$) can be obtained by the following formula respectively:

$$MV'_x = MV_x + \alpha \times \left(1 - \frac{w}{2}\right), MV'_y = MV_y$$

where $\alpha$ is the horizontal scaling factor, which can be approximated by the following formula:

$$\alpha = \frac{\text{height}}{\text{height} - \pi \times MV_y \times \tan\left(\frac{\pi}{2} - \frac{y}{\text{height}} \times \pi\right)}.$$

Step 2.3: obtaining a predicted value of the current pixel according to the obtained motion vector of the current pixel, and obtaining a prediction image block of the current image block.

According to the embodiment, preferably, when the obtained reference sample location pointed by the motion vector of the current pixel is not an integer pixel location, a sample value of a reference sample location is calculated by using an interpolation method, and the sample value is taken as a prediction value of the current pixel; when an obtained reference sample location pointed by the motion vector of the current pixel is an integer pixel location, the pixel value of the integer pixel location is taken as the sample value of the reference sample location, and the sample value is taken as a prediction value of the current pixel.

Specifically, the interpolation method in the embodiment is an adaptive interpolation method. The adaptive interpolation uses different interpolation filters. The selection of interpolation filters is determined by the reference sample coordinates (horizontal coordinate and vertical coordinate). The interpolation filter selection method comprises, but not limited to, the following way: Assuming that the coordinate of the reference sample location is (refX, refY), when the refY is less than height/2, the 4-tap filter is used for horizontal interpolation and the 8-tap filter is used for longitudinal interpolation; otherwise, the 8-tap filter is used for horizontal interpolation and the 4-tap filter is used for longitudinal interpolation. ¼ pixel accuracy is adopted for interpolation. For the 8-tap filter, the filter corresponding to the ¼ pixel position is {-1, 4, -10, 57, 19, -7, 3, -1}, the filter corresponding to the 2/4 pixel position is {-1, 4, -11, 40, 40, -11, 4, -1}, and the filter corresponding to the ¾ pixel position is {-1, 3, -7, 19, 57, -10, 4, -1}. For the 4-tap filter, the filter corresponding to the ¼ pixel position is {2, -9, 57, 17, -4, 1}, the filter corresponding to the 2/4 pixel position is {2, -9, 39, 39, -9, 2}, and the filter corresponding to the ¾ pixel position is {1, -4, 17, 57, -9, 2}.

As a part of the panoramic image is obtained through the fisheye camera, when the normal panorama image is obtained through cylindrical mapping, the longitudinal resolution of the upper part of the picture is high and the horizontal resolution is low. On the contrary, the longitudinal resolution of the lower part of the picture is low, and the horizontal resolution is high. In case of cylinder mapping, the part with low resolution is obtained by interpolation. This part of the picture is relatively smooth in the horizontal (or longitudinal) direction, so not many taps are required for interpolation. The amount of computation is reduced compared with the traditional interpolation method using the same filters. Therefore, in this embodiment, the interpolation filter is selected as described above. Certainly, in other embodiments, the interpolation filter can be designed freely according to the actual needs.

Step 3.3: performing motion compensation, and adding the pixel value of the predicted image block and that of the reconstructed residual block on the same position to obtain a reconstructed image block. The reconstructed image block is the decoded image block.

Embodiment 4

Figure 7:
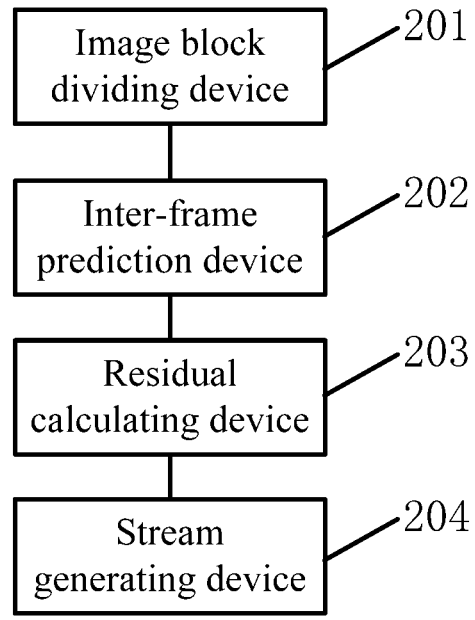
FIG. 7 is a system diagram of a panoramic video encoding system according to an embodiment in the present invention.

Referring to FIG. 7, corresponding to the panoramic video encoding method provided in Embodiment 1, a panoramic video encoding system is provided in this embodiment, comprising an image block dividing device 201, an inter-frame prediction device 202, a residual calculating device 203, and a stream generating device 204.

The image block dividing device 201 can divide the current image into a plurality of image blocks.

The inter-frame prediction device 202 can obtain a prediction image block of the current image block. Wherein, in this embodiment, the inter-frame prediction device 202 is the same as the inter-frame prediction device provided in Embodiment 2.

The residual calculating device 203 can subtract the current image block from the predicted image block to obtain a residual block.

The stream generating device 204 can transform, quantize, and entropy encode the residual block to obtain an encoded stream.

Embodiment 5

Figure 8:
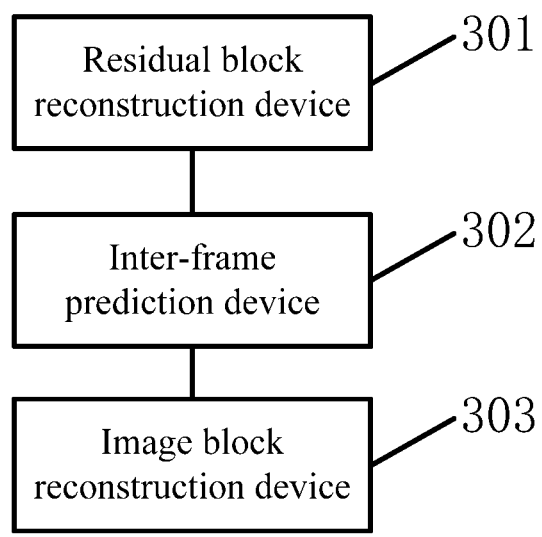
FIG. 8 is a system diagram of a panoramic video decoding system according to an embodiment in the present invention.

Referring to FIG. 8, corresponding to the panoramic video decoding method provided in Embodiment 3, a panoramic video decoding system is provided in this embodiment, comprising a residual block reconstruction device 301, an inter-frame prediction device 302, and an image block reconstruction device 303.

The residual block reconstruction device 301 can entropy decode, inverse quantize and inverse transform the encoded stream to obtain a reconstructed residual block.

The inter-frame prediction device 302 can obtain a prediction image block of the current image block. Wherein, in this embodiment, the inter-frame prediction device 302 is the same as the inter-frame prediction device provided in Embodiment 2.

The image block reconstruction device 303 can add the predicted image block to the reconstructed residual block to obtain a reconstructed image block.

It should be noted that, according to the embodiments of the present prevention, only the inter-frame prediction method in the panoramic video encoding and decoding process is described in detail. For other steps in the panoramic video encoding and decoding process, any one of the prior art feasible methods can be adopted. In addition, generally, the video processing device may comprise an encoding device and/or and a decoding device. The encoding device comprises encoding process and decoding process. The decoding device comprises decoding process. The decoding process of the decoding device is the same as the decoding process of the encoding device.

It is understood by those skilled in the field that all or part of steps of various methods according to the embodiments may be programmed to instruct the associated hardware to achieve the goals, which may be stored in a readable storage medium of computer, e.g. read-only memory, random access memory, disk, or CD.

The above contents are further detailed description of the present invention in connection with the disclosed embodiments. The invention is not limited to the embodiments referred to, but may be varied and modified by those skilled in the field without departing from the concept and scope of the present invention.

What is claimed is:

1. A method of inter-frame prediction for video encoding and decoding, comprising:
   obtaining a motion vector of a current image block and related spatial position information of a current pixel;
   obtaining a motion vector of the current pixel according to the motion vector of the current image block and the related spatial position information of the current pixel; and
   obtaining a predicted value of the current pixel according to the motion vector of the current pixel,
   wherein the step of obtaining a predicted value of the current pixel according to the obtained motion vector of the current pixel comprises:
   when a reference sample location pointed by the motion vector of the current pixel is not an integer pixel location, calculating a sample value of a reference sample location by using an interpolation method, and
   taking the sample value as a prediction value of the current pixel;
   when the reference sample location pointed by the motion vector of the current pixel is an integer pixel location, taking the pixel value of the integer pixel location as a sample value of the reference sample location, and
   taking the sample value as a prediction value of the current pixel.

2. The method of claim 1, wherein the related spatial position information of the current pixel comprises a size of the current image, coordinates of the current image block in the current image, a size of the current image block, and coordinates of the current pixel in the current image block.

3. The method of claim 2, wherein the steps of obtaining a motion vector of the current pixel according to the motion vector of the current image block and the related spatial position information of the current pixel comprises:
   obtaining the motion vector of the current pixel through the following functional relationship:

$$(MV'_x, MV'_y) = f(x, y, w, h, i, j, MV_x, MV_y, \text{width}, \text{height})$$

where f is a preset function, (x,y) is coordinate of a pixel at an upper left corner of the current image block in the current image, (i,j) is coordinate of the current pixel in the current image block, w and h are respectively a width and a height of the current image block, the width and the height in the functional relationship are respectively a width and a height of the current image, and ($MV_x, MV_y$) is the motion vector of the current image block.

4. The method of claim 1, wherein the interpolation method is an adaptive interpolation method, wherein an interpolation filter adopted by the adaptive interpolation method is determined according to the coordinates of the reference sample location.

5. The method of claim 1, further comprising:
   video encoding, comprising:
   dividing a current image into a plurality of image blocks;
   obtaining a predicted image block of the current image block using the predicted value of the current pixel;
   subtracting the current image block from the predicted image block to obtain a residual block; and
   transforming, quantizing, and entropy encoding the residual block to obtain an encoded stream.

6. The method of claim 1, further comprising:
video decoding, comprising:
entropy decoding, inverse quantizing and inverse transforming an encoded stream to obtain a reconstructed residual block;
obtaining a predicted image block of the current image block by using the predicted value of the current pixel; and
adding the predicted image block to the reconstructed residual block to obtain a reconstructed image block.

* * * * *